(No Model.)

J. R. HILL.
ENGRAVED PLATE.

No. 335,814. Patented Feb. 9, 1886.

WITNESSES
P. W. Hale
Frank D. Ellsworth

INVENTOR
John R. Hill

By his Attorney
R. K. Evans

UNITED STATES PATENT OFFICE.

JOHN R. HILL, OF WASHINGTON, DISTRICT OF COLUMBIA.

ENGRAVED PLATE.

SPECIFICATION forming part of Letters Patent No. 335,814, dated February 9, 1886.

Application filed November 26, 1884. Serial No. 148,962. (No model.)

*To all whom it may concern:*

Be it known that I, JOHN R. HILL, a citizen of the United States, residing at Washington city, in the District of Columbia, have invented certain Improvements in Printing from Engraved Plates; and I hereby declare the following to be a full, clear, and exact description of the same, reference being had to the accompanying drawings, making part of this specification, in which—

Figure 1:
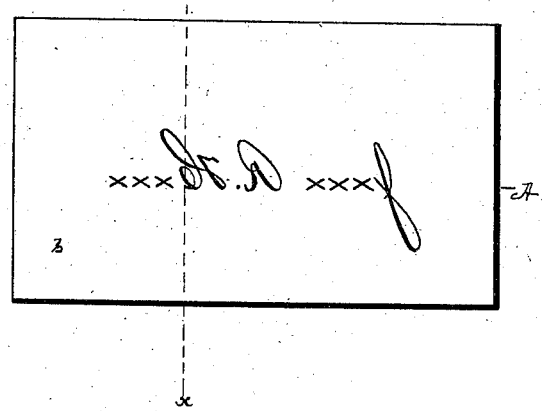
Figure 2:

Figure 1 is a plan of a plate made in accordance with my invention. Fig. 2 is an enlarged section of a portion of the same.

My invention relates generally to plates which are engraved to print from, or duplicates thereof, and is confined to no particular kind or kinds of plates, nor to any particular manner of making the lines on plates.

The object of my invention is to provide an engraved plate adapted for printing purposes, which will only receive the printing-ink in and upon the engraved lines, and reject or repel the ink throughout the plane surface of the plate in the same manner as a lithographic-printing stone, thereby avoiding the troublesome cleaning of superfluous ink from the plates, as is now necessitated by the devices and methods in use in plate-printing.

My invention consists in an engraved plate having its surface, with the exception of the printing-lines, covered with a coating of zinc, whereby the ink will, as the inking-roller is passed over the surface, adhere only to that portion of the plate represented by the printing-lines, and not adhere to the zinc-covered surface, the ink having no affinity for the zinc when properly prepared, and not adhering to it.

In order that those skilled in the art may make and use my invention, I will proceed to describe the exact manner in which I have carried it out.

A plate for printing purposes (lettered A in the drawings) is provided in any desirable manner with printing-lines *a a*. The surface of plate A is then coated in any well-known way with zinc film *b*, leaving the printing-lines free from the zinc film or coating, or the entire plate may receive the zinc film or coating.

Though I prefer to deposit the zinc coating on plate A by electrolysis, I by no means confine myself to any particular manner of making said deposit or zinc surface, but contemplate availing myself of any method or means that may be found desirable.

When the plate is properly coated, I fill the printing-lines with a suitable composition having an affinity for printing-ink. This composition for filling the lines may be some material of a waxy nature having the requisite toughness and cohesive qualities, or it may be made of a variety of materials, and I consequently confine myself to no particular material for or manner of filling the printing-lines.

After preparation as above described the plate may be treated with a solution of gum and acid in a similar manner to the preparation of a lithographic-printing stone, and is ready for use in any of the ways of printing known to those skilled in the art, the operation in plate-printing of cleaning the superfluous ink from the plate being dispensed with.

Previous to printing, the plate may be treated with a solution of dissolved gum, nitric acid, and extract of gall.

If, during the printing, a small quantity of gall is added to the dampening-water, it will have a tendency to keep the plate in a state of continual preparation.

Having thus described my invention, what I claim as new, and desire to secure by Letters Patent, is—

1. An engraved plate for printing purposes, having a coating of zinc exterior of the printing-lines, for the purposes set forth.

2. An engraved plate for printing purposes, having a zinc coating exterior of the printing-lines, and said printing-lines filled with a material having an affinity for printing-ink, substantially as described.

JOHN R. HILL.

Witnesses:
E. B. HAY,
JAMES E. FITCH.